United States Patent

Satou et al.

Patent Number: 5,702,122
Date of Patent: Dec. 30, 1997

[54] REAR SUSPENSION OF VEHICLE

[75] Inventors: Masaharu Satou, Tokyo; Tamiyoshi Kasahara; Takuya Murakami, both of Fujisawa; Kenji Kawagoe, Yokosuka; Takaaki Uno, Atsugi; Hideo Aimoto, Zama; Tamaki Horiuchi, Yokohama, all of Japan

[73] Assignee: Nissan Motor Co., Ltd., Yokohama, Japan

[21] Appl. No.: 540,393

[22] Filed: Oct. 6, 1995

[30] Foreign Application Priority Data

Oct. 7, 1994 [JP] Japan .................. 6-243982

[51] Int. Cl.$^6$ .................................. B60G 3/00
[52] U.S. Cl. .................. 280/691; 280/696; 280/701
[58] Field of Search .................... 280/691, 696, 280/701, 788, 725, 726, 710, 712, 702

[56] References Cited

U.S. PATENT DOCUMENTS 3,804,433  4/1974  Scherenberg et al. ......... 280/106.5 R

FOREIGN PATENT DOCUMENTS 2264300  7/1974  Germany .................. 280/696

57-121908  12/1981  Japan .
63-145112  6/1988  Japan .

OTHER PUBLICATIONS 831,045, Jun. 9, 1983, SAE Technical Paper Series.

*Primary Examiner*—Brian L. Johnson
*Assistant Examiner*—Jonathan E. Butt
*Attorney, Agent, or Firm*—Foley & Lardner

[57] ABSTRACT

An axle supporting member for a rear wheel is suspended to a suspension member by an upper link system which includes an A-arm and a side rod. The forward lower link member and the side rod are respectively arranged in front and rear of a vertical plane passing through a rotary axis of the rear wheel, while a suspension spring and a shock absorber are seated on the forward lower link member positioned in front of the above-mentioned vertical plane with respect to the longitudinal direction of the vehicle. Accordingly, an initial load transmitted from the suspension spring is mainly borne by the front end part of the suspension member, so that an initial load exerted to the rear end part of the suspension member becomes smaller. Thereby, it is possible to reduce the resilient deformation of bushings in the front and rear parts of the suspension member upon application of a wind-up input force.

11 Claims, 5 Drawing Sheets

REAR SUSPENSION OF VEHICLE

BACKGROUND OF THE INVENTION

1. Field of the Invention

The present invention relates to a rear suspension for suspending a rear wheel from a vehicle body.

2. Description of the Related Art

As disclosed in Japanese Patent Application Laid-Open No. 57-121907 and Japanese Patent Application Laid-Open No. 63-145112, a conventional vehicle rear suspension for suspending a rear wheel from a vehicle body comprises a suspension member resiliently supported to the vehicle body through the intermediary of bushings, a lower link system including lower link members supported to the suspension member so as to be vertically oscillatable, an upper link system including at least an upper link member supported to the suspension member so as to be vertically oscillatable, and a suspension spring interposed between the lower link system and the vehicle body.

In the rear suspension of this kind as disclosed in the above-mentioned documents, the suspension spring is usually seated on one of the link members in the lower link system, which one is positioned in rear of a vertical plane passing through the rotary axis of a rear wheel, with respect to the longitudinal direction of the vehicle, that is, in rear of the resilient center of the suspension member which is determined by the above-mentioned bushings.

It has been found that such a conventional rear suspension offers problems which will be mentioned hereinbelow. Referring to FIG. 7 which shows a suspension member "b" for attaching the conventional rear suspension to a vehicle body "a" together with a differential gear unit "c", the suspension member "b" is attached to the vehicle body "a" by means of resilient bushings "d", and link members constituting upper and lower link systems, are pivotally attached to the suspension member "b", so as to be supported to the vehicle body vertically oscillatably.

In this conventional rear suspension, a lower link member on which a suspension spring is seated, is positioned in rear of a vertical plane passing through the rotary axis of a rear wheel with respect to the longitudinal direction of the vehicle, that is, in rear of the resilient center of the suspension member, and accordingly, this rearward lower link member is pivoted to the suspension member "b", for example, at a position "e" shown in FIG. 7. Thus, as initial lead W adapted to be inputted to the suspension member "b" from the suspension spring through the lower link member on which the suspension spring is seated, during stopping of the vehicle, is mainly borne by the rear one of the front and rear bushings, as indicated by $W_R$, and accordingly, the load $W_F$ borne by the front bushing becomes very small.

Meanwhile, each of the front and rear bushings "d", tends to have a small spring constant so as to counter the effects of noise and vibration and to enhance the comfortability for passengers, and accordingly, the bushings are held in a condition in which they are resiliently deformed by the initial load W.

It has been found that the following problems occur is a large wind-up input force α which is effected to the suspension member "b" when a vehicle runs with high acceleration as in the case of starting, is applied, as shown by input forces $α_F$, $α_R$, to the front and rear resilient bushings, the large wind-up input force $α_R$ is additionally applied to the rear bushing "b" which has been applied thereto with the large shared initial load $W_R$, in the same direction as that of the shared initial load $W_R$, and accordingly, the rear resilient bushing is resiliently deformed further by a large degree. Thus, it is likely to greatly deteriorate the durability thereof.

Further, the wind-up input force $α_F$ applied to the front bushing is very large in comparison with the shared initial load $W_F$ whose direction of action is reversed to that of the wind-up input force $α_F$, that is, the initial load $W_F$ is very small in comparison. Accordingly, the front bushing falls into a condition in which it is largely deformed in the reverse (upward) direction, from a condition in which it is deformed in the downward direction. Thus it is likely to greatly deteriorate the durability thereof, similar to the rear bushing.

Further, in a conventional rear suspension in which a suspension spring is seated on a rearward lower link member which is positioned in rear of a vertical plane passing thorough the rotary axis of a rear wheel with respect to the longitudinal direction of the vehicle, it has been found that the following problems occur in the case of application of a rear wheel steering unit thereto, which case is increased in recent years.

That is, with the use of the conventional rear suspension, when the toe angle of the rear wheel is changed in the case of application of the rear wheel steering unit, a connecting rod between right and left rear wheels or the lower link member on which the rear suspension spring is seated, is pressed by a hydraulic cylinder. In the former case, attaching of the above-mentioned cylinder to the vehicle body is difficult or impossible due to the presence of a differential gear unit at the widthwise center of the vehicle, and in the latter case, the above-mentioned initial load perpendicular to the axis of the hydraulic cylinder is applied to the hydraulic cylinder, so that the rear wheel steering is hindered. Moreover, a shock absorber provided in parallel with the suspension spring approaches a dust boot for a rear wheel drive shaft during toe-in steering, and as a result, such a problem potentially occurs that the dust boot is damaged.

SUMMARY OF THE INVENTION

It is therefore an object of the present invention to provide an improved rear suspension of a vehicle, which can solve all of the above-mentioned problems.

To this end, according to a first aspect of the present invention, there is provided a rear suspension for a vehicle, comprising a suspension member resiliently supported to a member of a vehicle body through resilient bushings, a lower link system composed of a plurality of lower link members supported to the suspension member so as to be vertically oscillatable and including a forward lower link member whose vehicle side attaching point is positioned in front of a resilient center of the suspension member with respect to a longitudinal direction of the vehicle, which resilient center being determined by the bushings, an upper link system supported to the suspension member so as to be vertically oscillatable, and cooperating with the lower link system so as to suspend a rear wheel to the vehicle body, and a suspension spring extended between the lower link system and the vehicle body, and seated on the forward lower link member in the lower link system.

With the first aspect of the present invention, the rear wheel is vertically stroked, being guided by the lower and upper link systems, while the suspension spring performs a shock absorbing function.

By the way, with the first aspect of the present invention in which the suspension spring is seated on the forward link member of the link members constituting the lower link system, which has a vehicle body side attaching point positioned in rear of the resilient center of the suspension member with respect to the longitudinal direction of the vehicle, an initial load in the same direction as that of a wind-up input force acting upon the rear part of the suspension member becomes smaller, so that resilient deformation of the bushing in the rear part of the suspension member can be decreased correspondingly, thereby it is possible to enhance the durability of the rearward bushing.

Further, an initial load in a direction reverse to that of a wind-up input force acting upon the front part of the suspension member becomes larger, so that the resilient bushing in the front part of the suspension member is prevented from being resiliently deformed upward by a large degree, thereby it is possible to enhance the durability of the forward bushing.

According to a second aspect of the present invention, the above-mentioned upper link system is composed of an A-arm which is support to the vehicle body at two points so as to vertically oscillatable.

With the second aspect of the present invention in which the upper link system is composed of the A-arm supported to the vehicle body at two points, a space can be easily obtained above the lower link system, thereby it is possible to realize such a design that the suspension spring is seated on the lower link system as mentioned above while it is interposed between the lower link system and the vehicle body.

In addition, since the A-arm is attached at only one point on the rear wheel side, an axle supporting member for rotatably supporting the rear wheel, can have a simple structure, and the A-arm is advantageous in view of the cost of the rear suspension in comparison with the conventional one in which the upper link system is composed of a plurality of link members. Further, since the spring constant of the rear suspension can be decreased by a degree corresponding to a decrease in the number of the bushings to be attached, the comfortability for the passengers can be enhanced.

According to a third aspect of the present invention, the A-arm has a rear wheel side attaching point which is positioned in front of a resilient center of the lower link system with respect to the longitudinal direction of the vehicle.

With the third aspect of the present invention in which the rear wheel side attaching point of the above-mentioned A-arm is positioned in rear of the resilient center of the lower link system with respect to the longitudinal direction of the vehicle, the axis of a king pin which is indicated by a line connecting between the rear wheel side attaching point and the resilient center of the lower link system can have a caster angle which provides a negative trail as viewed in an elongating direction of the axis of the rear wheel, thereby it is possible to enhance the running stability.

According to a fourth aspect of the present invention, the above-mentioned lower link system incorporates, as link members other than the forward lower link member on which the suspension spring is seated, a radius rod extended from the rear wheel, obliquely forward and inward of the vehicle body, and a side rod extended widthwise of the vehicle body, in rear of the resilient center of the lower link system with respect to a longitudinal direction of the vehicle.

With the fourth aspect of the present invention, the stiffness of the rear suspension with respect to a longitudinal direction of the vehicle can be lowered only by tuning the resilient bushing relating to the radius rod, so as to enhance the harshness characteristic, and accordingly, the other suspension characteristic can be freely set by tuning the resilient bushings relating to the other link members while such a preferable harshness characteristic is maintained. Accordingly, the freedom of design can be greatly enhanced in comparison with the arrangement in which the lower link system is constituted by an A-arm.

According to a fifth aspect of the present invention, the radius rod has a rear wheel side attaching point which is aligned with an elongating axis of the forward lower link member as viewed from a point above the vehicle, and is positioned above the forward lower link member.

With the fifth aspect of the present invention, the rear wheel side attaching part of the radius rod can be stored in a groove in the forward lower link member composed of a channel member opened upward for seating the suspension spring, and accordingly, the rear wheel side attaching part of the radius rod can be set at a lower position. With this arrangement, it is possible to enhance the anti-lift effect.

According to a sixth aspect of the present invention, the above-mentioned side rod is coupled with a rear wheel steering mechanism.

With the sixth aspect of the present invention, when the toe angle of the rear wheel is changed upon application of the rear wheel steering mechanism, the side rod is pressed by a hydraulic cylinder of the steering mechanism. Thus attaching of the hydraulic cylinder of the vehicle body can be prevented from being hindered by a differential gear unit located at the widthwise center of the vehicle, and further, the hydraulic cylinder can be prevented from being applied with the above-mentioned initial load in a direction perpendicular to the axial direction thereof, thereby it is possible to prevent the above hindering of the rear wheel steering.

BRIEF DESCRIPTION OF THE DRAWING

The present invention will now be explained in more detail with reference to a preferred embodiment shown in the attached drawings, in which.

DETAILED DESCRIPTION OF THE PREFERRED EMBODIMENT

Figure 1:
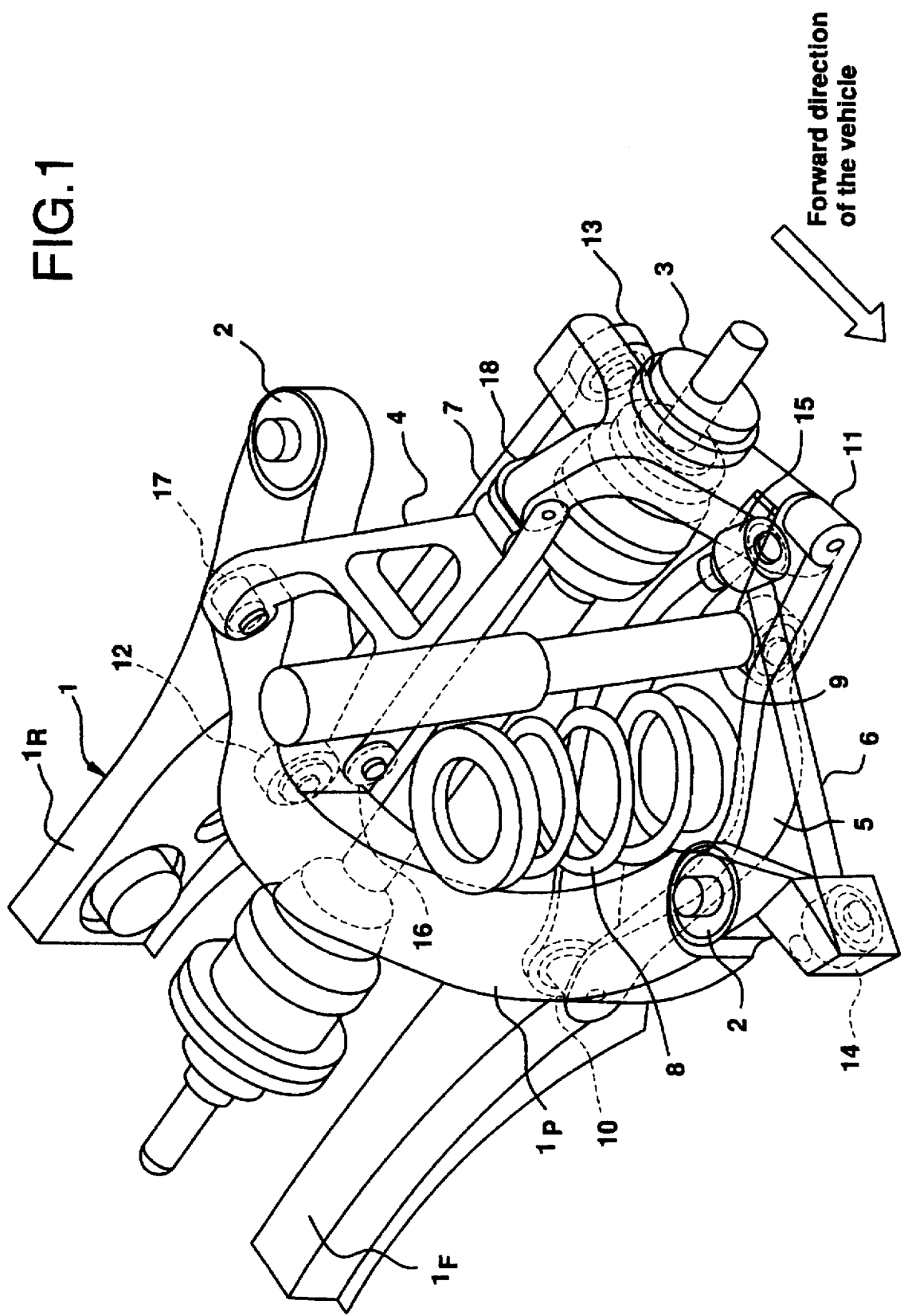
FIG. 1 is a perspective view illustrating an embodiment of a rear suspension of a vehicle according to the present invention, which is constituted for a left rear wheel of the vehicle, being viewed from a point in front of the vehicle at an angle thereto.
Figure 2:
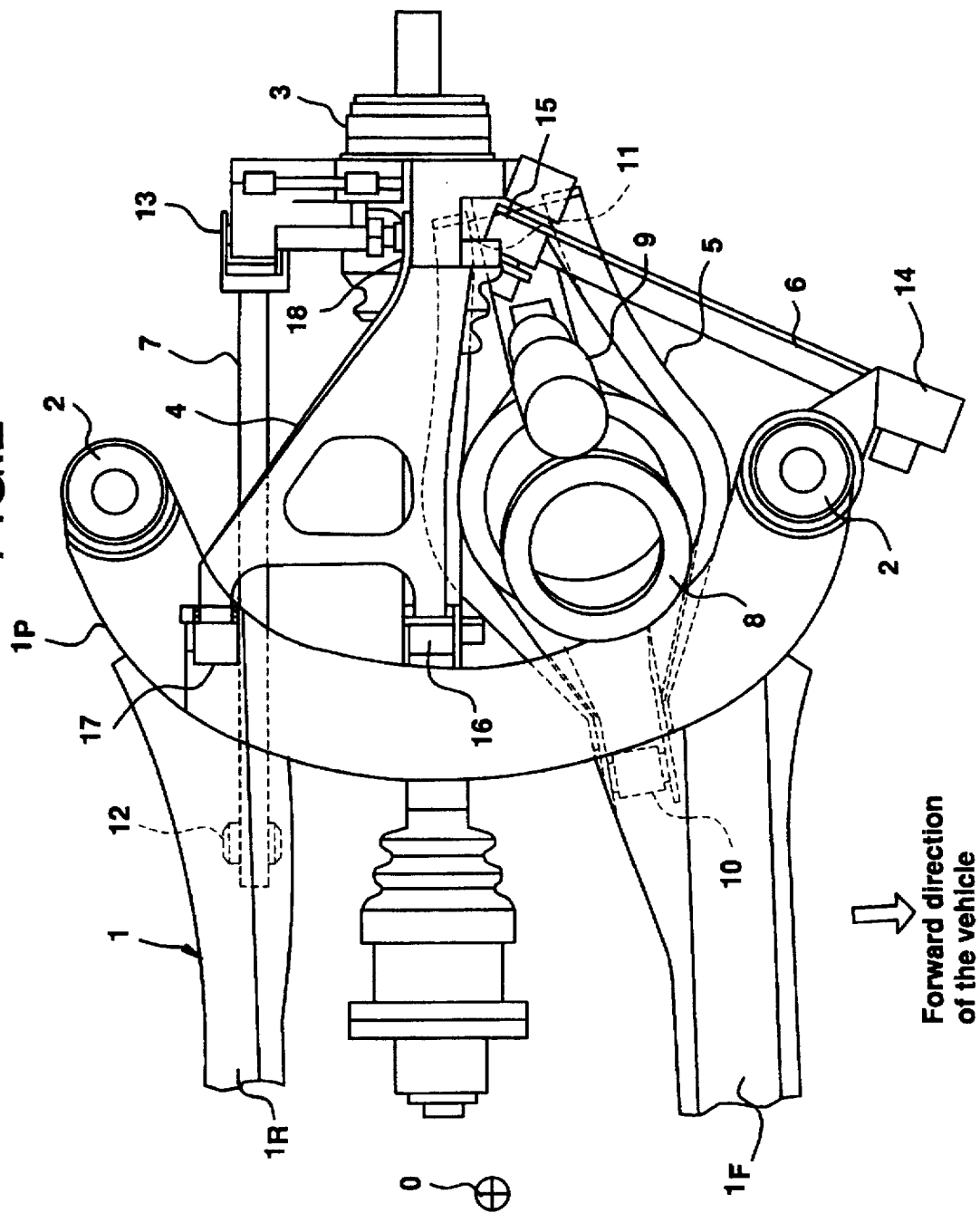
FIG. 2 is a plan view illustrating the rear suspension as viewed from a point thereabove.
Figure 3:
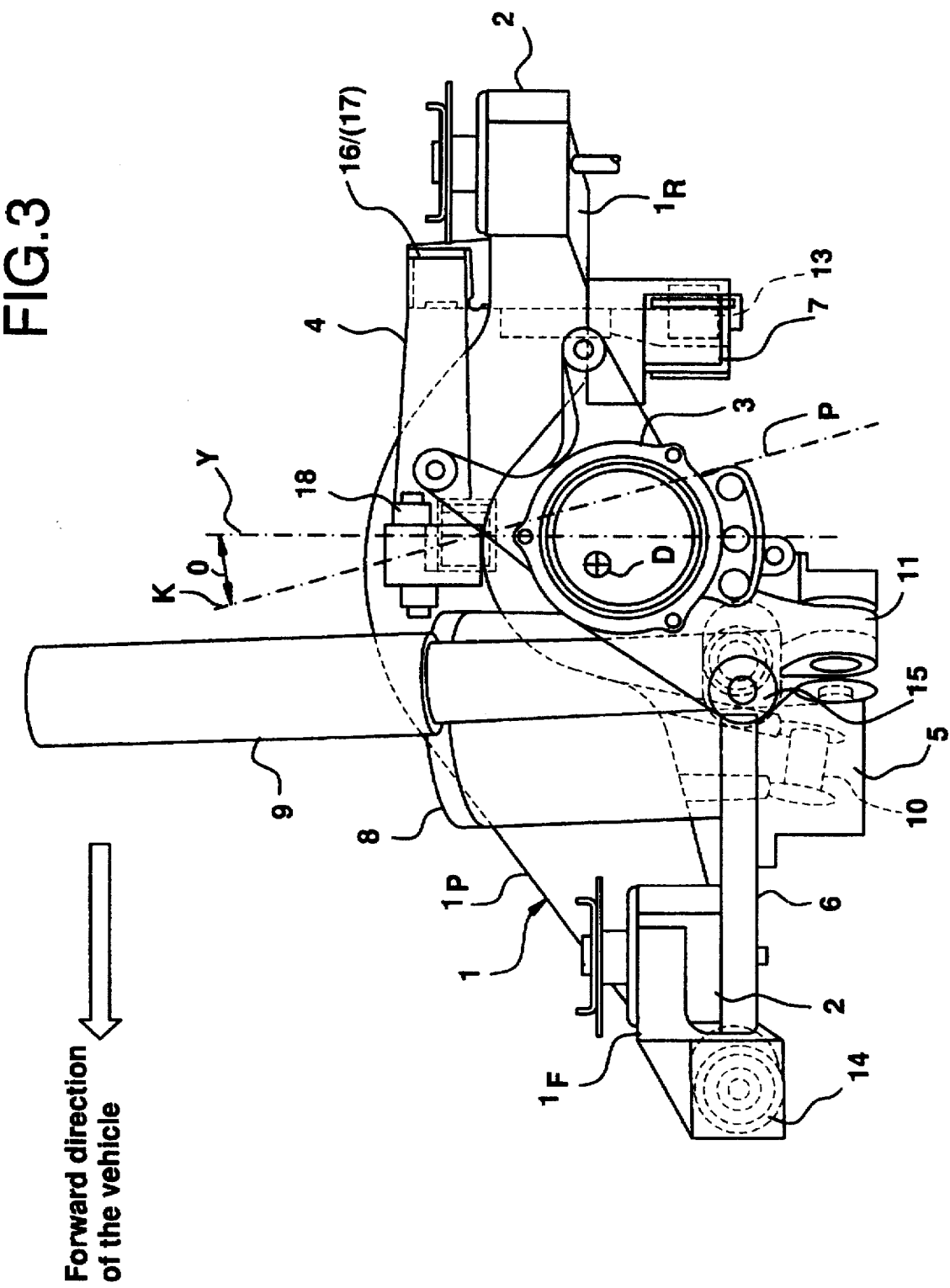
FIG. 3 is a side view illustrating the rear suspension as viewed in an elongating direction of the rotary axis of the left rear wheel which is viewed leftward of the vehicle.
Figure 4:
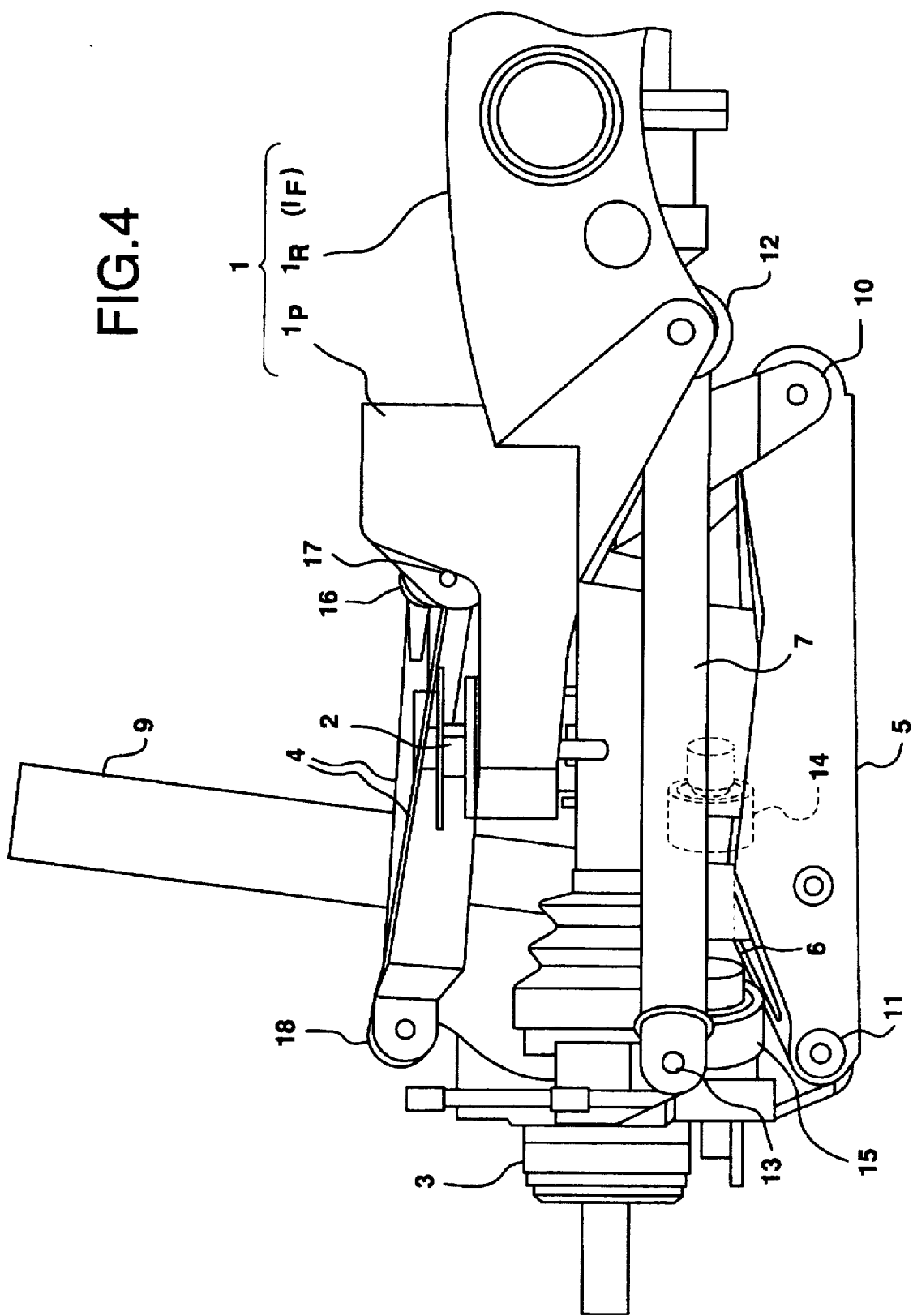
FIG. 4 is a rear view illustrating the rear suspension as viewed from rearward of the vehicle.

Referring now to FIGS. 1 to 4 showing an embodiment of a rear suspension according to the present invention, which is attached to a vehicle body (which is not shown) through the intermediary of a suspension member 1 in order to take measures to cope with noise and vibration as usual, and to enhance the comfortability for passengers. The suspension member 1 is formed of a rectangular unit frame composed of front and rear cross members $1_F$, $1_R$ which are extended widthwise of the vehicle body a substantially parallel relationship with each other, and a platform connected between the adjacent ends of the cross members. The suspension member 1 is mounted to the vehicle body by means of bushings 2 at four corners thereof in order to achieve the above-mentioned objects (the other two bushing connections nearby the other rear wheel are not shown in the figures). Further, the resilient center of the suspension member 1 determined by these bushings 2 is indicated by O as shown in FIGS. 2 and 3.

A left rear wheel (which is not shown) to be suspended by the shown rear suspension, is rotatably supported on an axle supporting member 3, and the axle supporting member 3 and the suspension member 1 are coupled together by linking therebetween with the use of an upper link system composed of an A-arm 4, and a lower link system composed of a lower link member 5 as the forward lower link member, a radius rod 6 and a side rod 7, so as to constitute the rear suspension.

At first, the lower link system will be explained. The lower link member 5 and the side rod 7 are respectively arranged in front and rear of a vertical plane Y with respect to the longitudinal direction of the vehicle, which vertical plane Y passing through the rotary axis of the rear wheel and between the lower link member 5 and the side rod 7, as shown in FIG. 3, and the lower link member 5 and the side rod 7 are extended substantially widthwise of the vehicle body. The lower link member 5 is formed of a channel member opened upward, for seating a suspension spring 8 to be extending between the lower link member 5 and the vehicle body, and for attaching a shock absorber 9. Further, the lower link member 5 is attached to the front cross member $1_F$ of the suspension member 1 through the intermediary of a resilient bushing 10 so as to be oscillatable vertically of the vehicle body, and is also attached to the axle supporting member 3 through the intermediary of a resilient bushing 11 so as to be oscillatable.

It is noted the resilient bushing 10 positioned at the vehicle side attaching point of the lower link member 5 and the resilient bushing 11 positioned at the rear wheel side attaching point of the lower link member 5, are both positioned in front of the above-mentioned vertical plane Y, and the resilient bushing 10 is in front of the resilient bushing 11 with respect to the longitudinal direction of the vehicle body. As a result, the resilient bushing 10 positioned at the vehicle side attaching point of the lower link member 5, and the resilient bushing 11 positioned at the rear wheel side attaching point of the lower link member 5 are both positioned in front of the resilient center O of the suspension member 1 with respect to the longitudinal direction of the vehicle.

Meanwhile, the side rod 7 is attached to the rear cross member $1_R$ of the suspension member 1 through the intermediary of a resilient bushing 12 so as to be oscillatably vertically of the vehicle body, and is oscillatably attached to the side supporting member 3 through the intermediary of a resilient bushing 13. The resilient bushing 12 positioned at the vehicle side attaching point of the side rod 7 and the resilient bushing 13 positioned at the rear wheel side attaching point of the side rod 7 are both positioned in rear of the vertical plane Y with respect to the longitudinal direction of the vehicle.

The radius rod 6 is extended from the axle supporting member 3, obliquely forward and inside of the vehicle body in front of the vertical plane Y, and is attached at the front end thereof to the front cross member $1_F$ of the suspension member 1 thorough the intermediary of a resilient bushing 14 so as to be freely oscillatable vertically of the vehicle body, and is oscillatably attached at the rear end thereof to the axle supporting member 3 through the intermediary of a resilient bushing 15. As clearly shown in FIG. 5, the resilient bushing 15 positioned at the rear wheel side attaching point of the radius rod 6 is aligned with an elongating axis of the lower link member 5, as viewed from a point above the vehicle, and is positioned above the lower link member 5. In this arrangement, a resilient center of the lower link system indicated by a point P in FIG. 3, is preferably positioned in rear of the vertical plane Y with respect to the longitudinal direction of the vehicle.

Next, the upper link system will be explained. An A-arm constituting the upper link system is extended substantially widthwise of the vehicle body, having its bifurcated proximal end parts which are located inside of the vehicle body and which are pivoted to the platform $1_P$ of the suspension member 1 by means of two resilient bushings 16, 17 so that the A-arm 4 is freely oscillatable vertically of the vehicle body. The distal end part of the A-arm 4, remote from the bifurcated end parts, is oscillatably attached to the axle supporting member 3 through the intermediary of a resilient bushing 18, the attaching point thereof being positioned in front of the resilient center P (as shown in FIG. 3) of the lower link system with respect to the longitudinal direction of the vehicle.

In the case of the provision of a rear wheel steering unit which is not shown, a hydraulic cylinder serving as a rear wheel steering actuator is connected to the vehicle body side attaching point (the end part at which the resilient bushing 12 is positioned) of the side rod 7. In this case, when the toe angle of the rear wheel is changed, the side rod 7 is pushed by the hydraulic cylinder at a place where no differential gear unit is present, and accordingly, the differential gear unit is not hindered from attaching the hydraulic cylinder to the vehicle body. Further, since the hydraulic cylinder is connected to the side rod 7 which is not affected by the suspension spring 8, it is possible to prevent the rear wheel steering from being hindered by an initial load inputted to the hydraulic cylinder from the suspension spring 8, perpendicular to the axis thereof.

Next, an explanation will be made of the operation of the above-mentioned embodiment.

The left rear wheel which is not shown and which is rotatably mounted on the axle supporting member 3, is guided by the upper link system composed of the A-arm 4, and a lower link system composed of the lower link member 5, the radius rod 6 and the side rod 7 so as to be vertically stroked. During this stroking, the suspension spring 8 effects a shock damping function, while the shock absorber 9 effects a vibration damping function.

Figure 6:
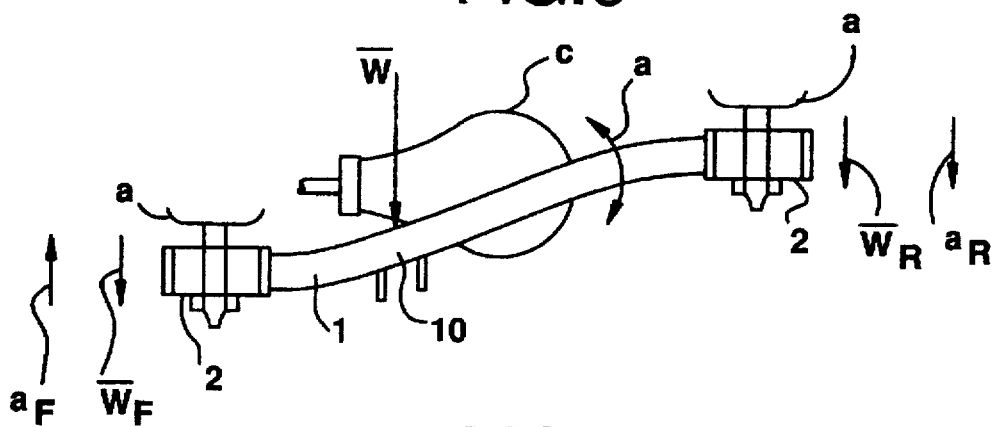
FIG. 6 is an explanatory view showing an initial load and a wing-up input force applied upon a suspension member in the case of using the rear suspension according to the present invention.
Figure 7:
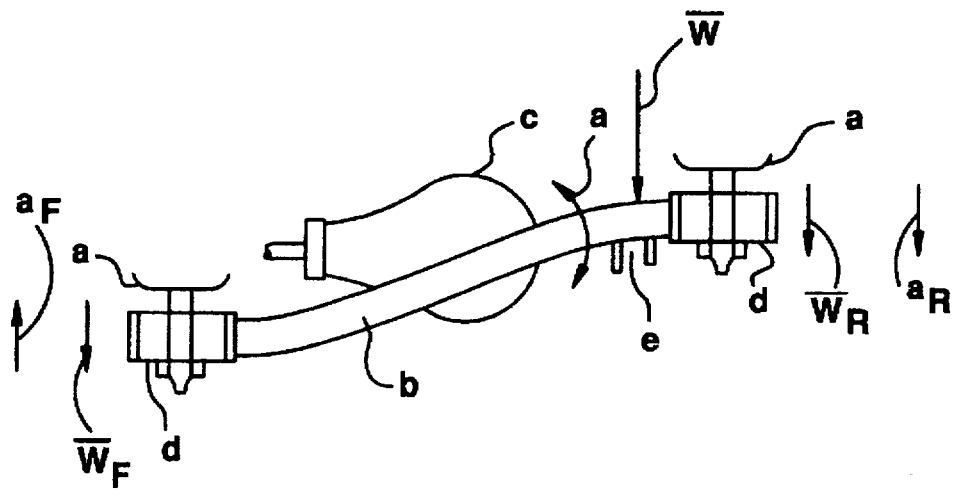
FIG. 7 is an explanatory view showing an initial load and a wind-up input force applied upon a suspension member in the case of using a conventional rear suspension.

By the way, since the suspension spring 8 is seated on the lower link member 5 whose vehicle body side attaching point 10 is positioned in front of the resilient center O of the suspension member 1, among link members constituting the lower link system, the initial load W which is inputted to the suspension member 1 from the suspension spring 8 by way of the lower link member 5 on which the suspension spring 8 is seated, is inputted to the suspension member 1 at the vehicle side attaching point 10 as shown in FIG. 6. Accordingly, this initial load W is mainly born by the front one of the front and rear resilient bushings 2 on the suspension member 1 as indicated by $W_F$ shown in the same figure, and the shared load $W_R$ born by the rear resilient bushing becomes very small. Thereby, it is possible to obtain the following technical effects.

In consideration with such a case that a large wind-up input force α acts on the suspension member 1 during running which exerts a high acceleration to the vehicle body, such as during starting of the vehicle, is applied to the front and rear resilient bushings 2 as indicated by $α_F$, $α_R$, the initial load $W_R$ acting in the same direction as that of the wind-up input force $α_R$ acting on the rear part of the suspension member 1 becomes small, and accordingly, the resilient deformation of the resilient bushing in the rear part of the suspension member is decreased correspondingly, thereby it is possible to enhance the durability of the rearward resilient bushing.

Next, in consideration with the front part of the suspension member 1 on the opposite side, the initial load $W_F$ acting in a direction reverse to that of the wind-up input force $α_F$ acting upon the front part of the suspension member 1 is large, and accordingly, the resilient bushing in the front end part of the suspension member is prevented from being resiliently deformed upward to a large degree by the wind-up input force $α_R$, thereby it is possible to enhance the durability of the forward resilient bushing.

As stated above, with the rear suspension in this embodiment, no consideration is required as to strokes of the front and rear parts of the suspension member in association with the large wind-up input force α during starting, and accordingly, the spring constant can be sufficiently decreased. Thereby it is possible to cope with noise and vibration and to enhance the comfortability for passengers. Thus, the degree of freedom in designing can be greatly enhanced.

Moreover, with the rear suspension in this embodiment, the rear wheel side attaching point 11 of the lower link member 5 is located at a possibly lowest position, so that the camber stiffness can be conveniently enhanced as high as possible.

Further, with the rear suspension in this embodiment in which the lower link system incorporates the radius rod 5 extended from the rear wheel, obliquely forward and inward of the vehicle body, and the side rod extended widthwise of the vehicle body, in rear of the resilient center P of the lower link system with respect to the longitudinal direction of the vehicle, as link members except the lower link member 5 on which the suspension spring 8 is seated, the stiffness of the rear suspension with respect to the longitudinal direction of the vehicle can be lowered only by tuning of the resilient bushings 14, 15 relating to the radius rod 6 so as to enhance the harshness characteristic. Accordingly, the other suspension characteristics can be freely set by tuning the resilient bushings relating to the other link members, while such an preferable harshness characteristic is maintained. With this arrangement, it is possible to ensure a high degree of freedom which is difficult to obtain by an arrangement of the lower link system being composed of an A-arm.

Figure 5:
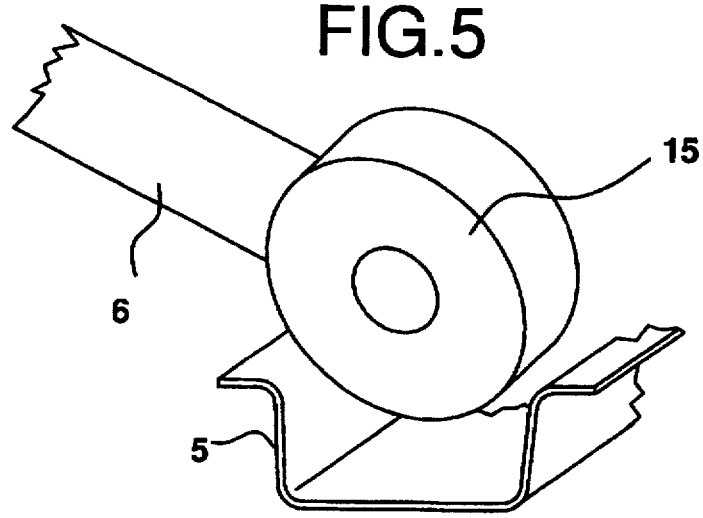
FIG. 5 is a detailed view showing the positional relationship between the a rear side attaching bushing for a radius rod and a forward lower link member in the rear suspension.

In addition, according to the arrangement in this embodiment in which the above-mentioned resilient bushing 15 positioned at the rear wheel attaching point of the radius rod 5 is aligned with the elongating axis of the lower link member 5 and is positioned above the lower link member 5 as clearly shown in FIG. 5, the resilient bushing 15 positioned at the rear wheel side attaching point of the radius rod 6 is received in the groove of the radius rod 6 which is formed of a channel-like member opened upward in order to seat the suspension spring 8 and to attach the shock absorber 9, so that the rear wheel side attaching point of the radius rod 6 can be located at a lower position. Thereby, it is possible to enhance the anti-lift effect.

Further, since the above-mentioned resilient bushing 18 positioned at the rear wheel side attaching point of the A-arm 4 constituting the upper link system as shown in FIG. 3, is positioned in front of the resilient center P of the lower link system with respect to the longitudinal direction of the vehicle, the king pin axis K which is indicated by a line connecting between the rear wheel attaching point 18 of the A-arm 4 and the resilient center P of the lower link system has a caster angle θ which can provide a negative trail as viewed in the elongating direction of the rear wheel axis. Thereby it is possible to enhance the running stability.

In the case of the arrangement in which the upper link system is constituted by the A-arm 4 as in the above-mentioned embodiment, a space can be easily ensured above the lower link system, and accordingly, a layout can be easily realized in which the suspension spring 8 and the shock absorber 9 are seated on the lower link system and are laid as in this embodiment between the latter and the vehicle body.

In addition, since the A-arm 14 only has one rear wheel side attaching point 18, the structure of the axle supporting member 3 which rotatably bears the rear wheel can be simplified. Further, since the A-arm 4 is advantageous in view of the cost in comparison with such an arrangement that the upper link system is composed of a plurality of link members, and since the number of bushings required for attachment is less, the spring constant of the rear suspension can be decreased. Thereby, it is possible to greatly enhance the comfortability for passengers.

The foregoing description is by way of example only, and not intended to limit the scope of the appended claims.

What is claimed is:

1. A rear suspension of a vehicle having a vehicle body, comprising:

a suspension member adapted to be resiliently supported to the floor of said vehicle body through at least a first and a second resilient bushing;

a vertically-oscillatable lower link system including, a curved forward lower link member extending along a widthwise direction with respect to said vehicle body, said curved forward lower link member having a channel region, said forward link member having a first end adapted to be connected to said axle supporting member by a third resilient bushing, said forward lower link member having a second end adapted to be connected to said suspension member by a fourth resilient bushing; and a radius rod having a first end adapted to be seated in the channel region adjacent to the first end of said forward lower link member, said radius rod having a second end adapted to be connected to said suspension member by a fifth resilient bushing;

a vertically-oscillatable upper link system coupled to said suspension member by at least a sixth and a seventh resilient bushing, said vertically-oscillatable upper link system cooperating with said vertically-oscillatable lower link system and adapted to suspend the rear wheel to said vehicle body; and a suspension spring adapted to extend between said vertically-oscillatable lower link system and said vehicle body, said suspension spring adapted to seat in the channel region in a central region between the first and second ends of said forward lower link member.

2. A rear suspension for a vehicle as set forth in claim 1, wherein said vertically-oscillatable lower link system includes a side rod adapted to be disposed substantially along the widthwise direction with respect to said vehicle body, said side rod having a first end adapted to be coupled to said axle supporting member by an eighth resilient bushing, and a second end adapted to be coupled to said suspension member by a ninth resilient bushing;

and wherein said vertically-oscillatable upper link system includes an A-arm having a first end and second end at one side thereof, the first and second ends adapted to be coupled to said suspension member by said sixth and seventh resilient bushings, respectively, said A-arm having a third end at an opposite side as said first and second ends of said A-arm, the third end adapted to be coupled to said axle supporting member by a tenth resilient bushing, wherein said A-arm is adapted to be disposed substantially along the widthwise direction with respect to said vehicle body.

3. A rear suspension for a vehicle as set forth in claim 1, wherein said third and fourth resilient bushings are both adapted to be positioned forwardly of a vertical plane corresponding to a mounted location of the rear wheel on said axle supporting member, with respect to a longitudinal direction of said vehicle body, and wherein said third and fourth resilient bushings are also both adapted to be positioned forwardly of a resilient center of said suspension member, with respect to the longitudinal direction of said vehicle body.

4. A rear suspension for a vehicle as set forth in claim 3, wherein said radius rod is adapted to extend obliquely forward and inward of said vehicle body, and wherein a resilient center of said vertically-oscillatable lower link system is adapted to be positioned rearwardly of the vertical plane corresponding to the mounted location of the rear wheel on said axle supporting member, with respect to the longitudinal direction of said vehicle body.

5. A rear suspension for a vehicle as set forth in claim 4, wherein said tenth resilient bushing is adapted to be positioned forwardly of the resilient center of said vertically-oscillatable lower link system, with respect to the longitudinal direction of said vehicle body.

6. A rear suspension for a vehicle as set forth in claim 1, wherein an initial load transmitted from said suspension spring is adapted to be mainly borne by a front end part of said suspension member, so that an effect of the initial load exerted to the rear end part of said suspension member is minimized.

7. A rear suspension for a vehicle as set forth in claim 6, wherein resilient deformation of said resilient bushing in the front end part of said suspension member is reduced and resilient deformation of said resilient bushing in the rear end part of said suspension member is slightly increased upon application of a wind-up input force applied after the initial load is transmitted.

8. A rear suspension for a vehicle as set forth in claim 1, further comprising a shock absorber adapted to extend between said lower link system and said vehicle body, and adapted to seat on said forward lower link member in said lower link system.

9. A rear suspension for a vehicle as set forth in claim 1, further comprising a shock absorber adapted to extend between said lower link system and said vehicle body, said shock absorber adapted to seat in the channel region in the central region between the first and second ends of said forward lower link member, said shock absorber adapted to be located between said axle supporting member and said suspension spring.

10. A rear suspension for a vehicle as set forth in claim 1, further comprising a straight rearward lower link member adapted to extend along the widthwise direction with respect to said vehicle body, and said forward lower link member has a curved forward part and a curved rearward part, wherein said suspension spring is seated between the forward and rearward parts of said forward lower link member.

11. A rear suspension for a vehicle as set forth in claim 10, wherein said forward and rearward parts of said forward lower link member are disposed in a substantially coplanar relationship with respect to each other.

* * * * *